M. OSTROWIECKI.
VEHICLE FENDER.
APPLICATION FILED APR. 28, 1917.

1,232,835.

Patented July 10, 1917.
2 SHEETS—SHEET 1.

Inventor
M. Ostrowiecki

By N. M. Wilson
Attorney

M. OSTROWIECKI.
VEHICLE FENDER.
APPLICATION FILED APR. 28, 1917.
1,232,835.
Patented July 10, 1917.
2 SHEETS—SHEET 2.
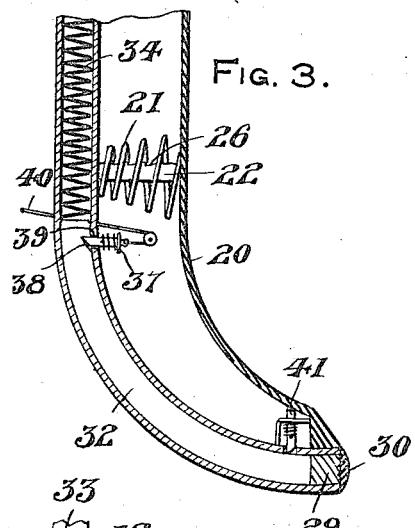
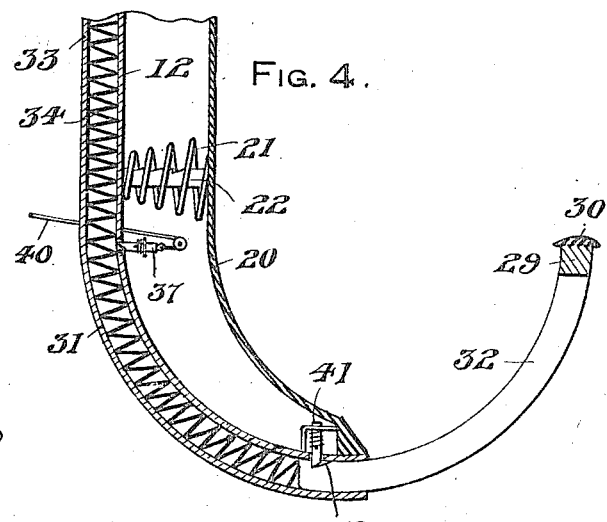
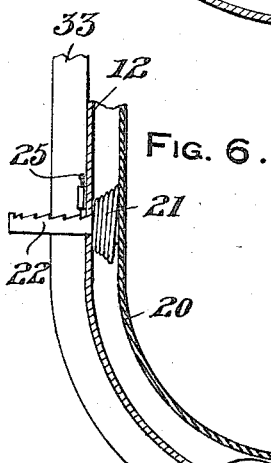
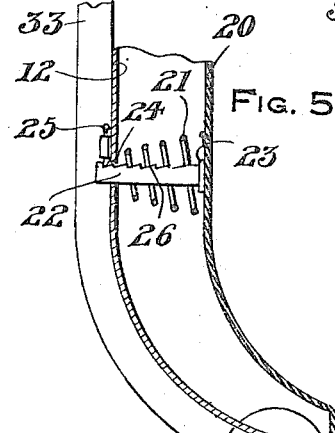
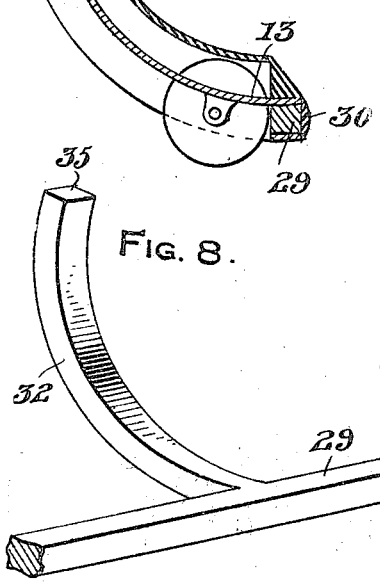
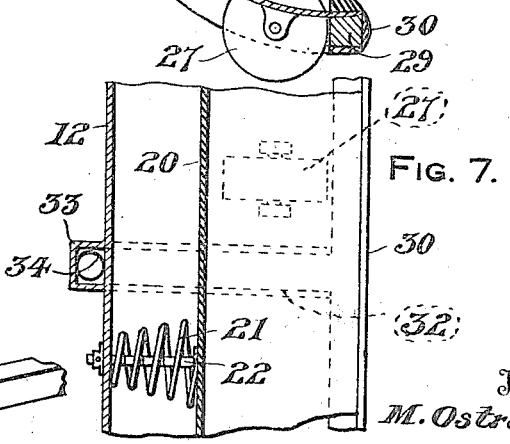
Inventor
M. Ostrowiecki
By A. M. Wilson
Attorney

UNITED STATES PATENT OFFICE.

MARCIN OSTROWIECKI, OF CHICAGO, ILLINOIS.

VEHICLE-FENDER.

1,232,835.  Specification of Letters Patent.  Patented July 10, 1917.

Application filed April 28, 1917. Serial No. 165,190.

*To all whom it may concern:*

Be it known that I, MARCIN OSTROWIECKI, a citizen of Russia, residing at Chicago, in the county of Cook and State of Illinois, have invented certain new and useful Improvements in Vehicle-Fenders, of which the following is a specification.

This invention relates to certain new and useful improvements in vehicle fenders.

The primary object of the invention is the provision of a safety appliance in the nature of a fender adapted for use upon vehicles such as automobiles, whereby a person struck thereby will be saved from injury as well as being prevented from falling upon the roadbed.

A further object of the device is the provision of a resiliently arranged buffer for automobiles operable by the driver thereof for catching and retaining the pedestrian thereon when struck by the buffer during the forward travel of the automobile.

With these general objects in view and others that will appear as the nature of the invention is better understood, the same consists in the novel construction, combination and arrangement of parts hereinafter more fully described, illustrated in the accompanying drawings, and then claimed.

In the drawings forming a part of this application and in which like designating characters refer to corresponding parts throughout the several views:

Fig. 3 is an enlarged detail sectional view taken upon line III—III of Fig. 2.

Fig. 4 is a view similar to Fig. 3 with the retainer operatively projected.

Fig. 5 is an enlarged detail vertical sectional view through a lower portion of the device.

Fig. 6 is a view similar to Fig. 5 with the covering or upholstery depressed.

Fig. 7 is an enlarged detail horizontal sectional view taken upon line VII—VII of Fig. 2, and, Fig. 8 is a perspective view of a portion of the retainer detached.

Figure 1:
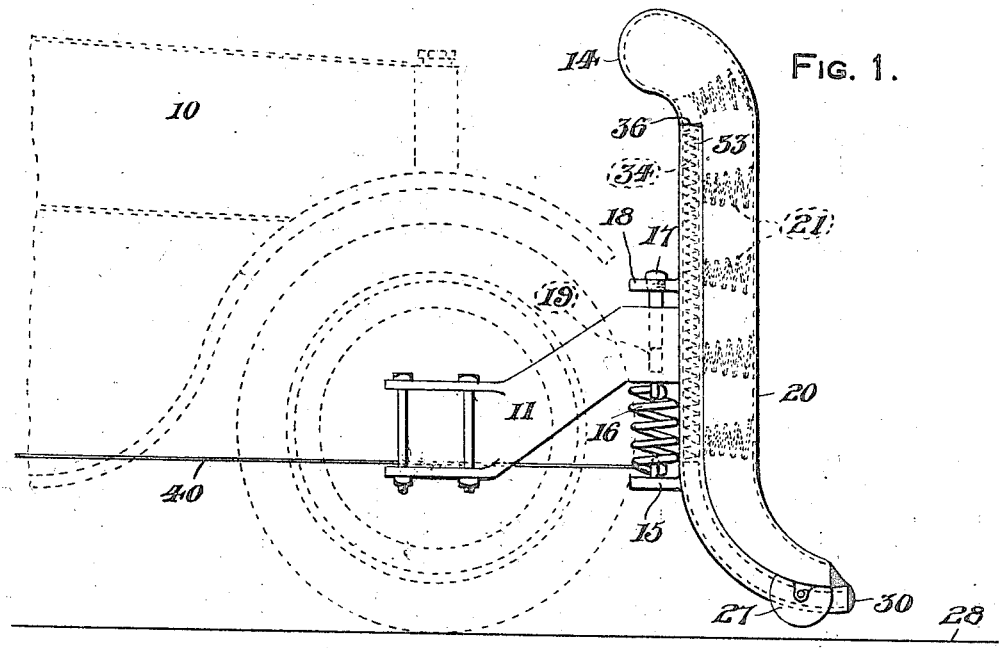
Figure 1 is a side elevation of the device operatively arranged forwardly of an automobile, the forward portion of the latter being indicated by dotted lines.
Figure 2:
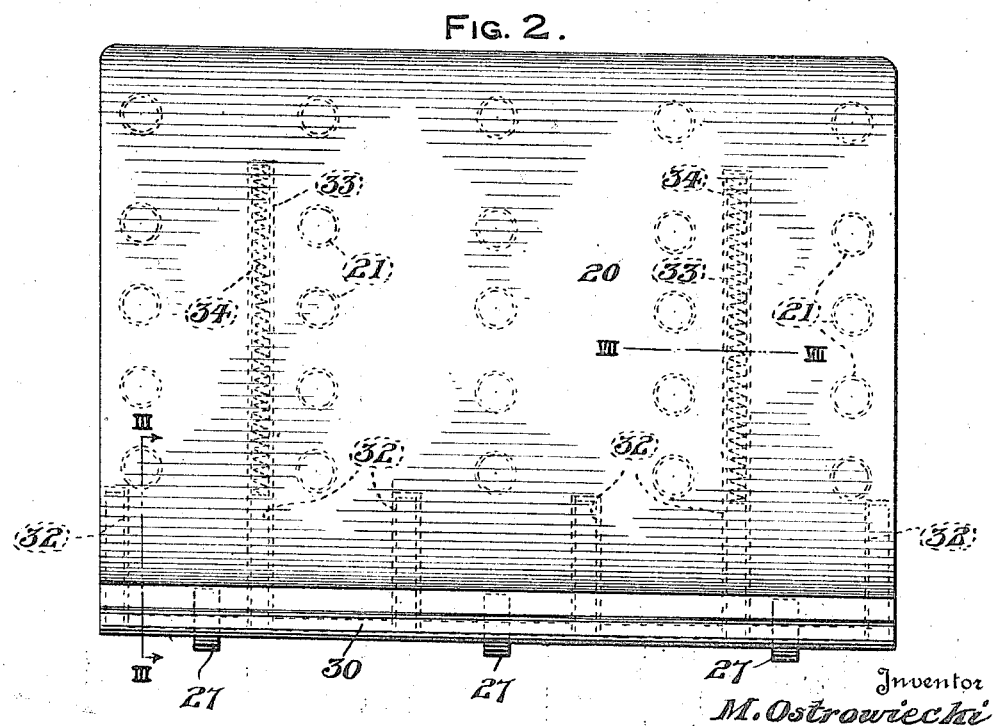
Fig. 2 is a front elevation of the device.

The present fender is readily mounted upon any form of vehicle, as herein illustrated, in connection with an automobile 10 and secured forwardly thereof by means of brackets 11. The fender consists of a back plate or base 12 forwardly curved at the bottom or lower end 13 thereof and rearwardly curved at its upper end 14.

The base 12 is resiliently mounted for vertical sliding movement at the forward free ends of the brackets 11 by rearwardly projecting arms 15 provided upon the base 12 which are suspendingly attached to the brackets 11 by means of coil springs 16 while guide bolts 17 are carried by rearwardly projecting lugs 18 with the said bolts slidably positioned within sockets 19 in the said brackets. A flexible upholstery or covering 20 is arranged over the forward face of the base plate 12 with helical springs 21 positioned between the covering 20 and the plate 12. Rods 22 are secured as at 23 to the covering 20 within the springs 21 and have their outer ends projecting through perforations 24 in the plate 12, spring-pressed retaining catches 25 being carried upon the rear face of the plate 12 for engaging within notches 26 upon the adjacent faces of the rods 22.

Rollers 27 are journaled upon the lower end 13 of the base 12, it being understood that the entire fender being resiliently carried upon the automobile 10 by means of the springs 16, the rollers 27 may at times engage the roadbed 28 while upon striking an object or a person by the covering 20, the springs 21 will be depressed and the force of the impact cushioned, forcing the rods 22 rearwardly and retained by the catches 25, as best illustrated in Fig. 6 of the drawing, it being understood that any additional weight placed upon the device brings the rollers 27 in contact with the road-bed.

A manually operable retaining means is arranged consisting of a buffer bar 29 normally arranged adjacent and beneath the forward portion of the lower base end 13, the same preferably having a rubber strip 30 carried thereby. A plurality of upwardly curved tubular casings 31 are arranged rearwardly of the base plate 12 adapted for the sliding reception of upwardly curved guide extensions 32 rearwardly projecting from the bar 29, it being understood that by projecting and retracting the guides 32, the bar 29 will be respectively elevated and lowered forwardly of the device for the purpose of catching and holding any person or object which is hit by the fender and thereby preventing further injury thereto.

Any desirable number of the casings 31 are provided with rear upward extensions 33 for the reception of coil springs 34 tensioned between the upper ends 35 of the adjacent guides 32 and the upper ends 36 of the said casing extensions 33. Spring-pressed latches 37 are arranged within the covering 20 for retaining engagement within notches 38 of the guides 32, the said latches 37 being normally projected through rear slots 39 of the device. An operating cord 40 is attached to the latches 37 adapted for operation by the driver of the automobile. Upon pulling the cord 40, the latches 37 are released and the guides 32 as well as the buffer bar 29 are forced outwardly by the springs 34 to the position best illustrated in Fig. 4 of the drawings. A retainer 41 is preferably provided for each of the guides 32 adjacent the forward end of the base 12 for engaging the notches 38 when the retainer is operatively projected.

It will be seen that when a person is hit by the fender, the operator of the vehicle may project the buffer bar 29 for engaging and retaining the person upon the fender. The retainer may be replaced to its retracted normal position by exerting a suitable force upon the buffer bar 29 to retract the guides 32 while the catches 25 may be readily released from the rods 22 for permitting the forward movement of the covering 20.

What I claim as new is:—

1. A fender comprising a base, a spring-mounted covering forwardly carried thereby, and retaining means arranged between said base and covering adapted for retaining the latter in its depressed arrangement.

2. A fender comprising a base, a spring-mounted covering forwardly carried thereby, retaining means arranged between said base and covering adapted for retaining the latter in its depressed arrangement, a buffer bar forwardly carried at the lower end of the said base, projecting means for the said bar, and manually operable controlling means for the said projecting means.

3. A vehicle fender comprising a curved base adapted for positioning forwardly of a vehicle, resilient mounting and guiding means for the said base, resiliently mounted upholstery carried by said base, and automatic adjustment retaining means for the said upholstery.

4. A fender comprising an upright positioned forwardly curved base, a buffer bar transversely arranged adjacent thereto, rearwardly curved guides carried by said buffer bar adjacent the said base, normally tensioned operating springs for the said guides, and manually releasable retaining latches for the latter.

5. A fender comprising an upright positioned forwardly curved base, a buffer bar transversely arranged adjacent thereto, rearwardly curved guides carried by said buffer bar adjacent the said guides, manually releasable retaining latches for the latter, ground-engaging rollers journaled adjacent the lower end of said base, and retaining latches for the said guides positioned adjacent thereto.

In testimony whereof I affix my signature.

MARCIN OSTROWIECKI.

Copies of this patent may be obtained for five cents each, by addressing the "Commissioner of Patents, Washington, D. C."